US012676374B2

(12) United States Patent (10) Patent No.: US 12,676,374 B2
Liu et al. (45) Date of Patent: Jul. 7, 2026

(54) CYLINDRICAL BATTERY MODULE

(71) Applicant: EVE POWER CO., LTD., Jingmen (CN)

(72) Inventors: Junpeng Liu, Jingmen (CN); Bohao Xu, Jingmen (CN); Jibing Jiang, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 672 days.

(21) Appl. No.: 18/029,334

(22) PCT Filed: Feb. 3, 2021

(86) PCT No.: PCT/CN2021/074987
§ 371 (c)(1),
(2) Date: Mar. 29, 2023

(87) PCT Pub. No.: WO2022/121105
PCT Pub. Date: Jun. 16, 2022

(65) Prior Publication Data
US 2023/0361406 A1 Nov. 9, 2023

(30) Foreign Application Priority Data

Dec. 8, 2020 (CN) .......................... 202011444095.8

(51) Int. Cl.
*H01M 50/213* (2021.01)
*H01M 10/613* (2014.01)
(Continued)

(52) U.S. Cl.
CPC ....... *H01M 50/213* (2021.01); *H01M 10/613* (2015.04); *H01M 10/643* (2015.04);
(Continued)

(58) Field of Classification Search
CPC ............. H01M 50/213; H01M 10/613; H01M 10/643; H01M 10/6557; H01M 10/658;
(Continued)

(56) References Cited

U.S. PATENT DOCUMENTS

2007/0072061 A1 3/2007 Shimizu
2009/0301700 A1* 12/2009 German ................ B29C 66/301
165/160
2021/0399357 A1* 12/2021 Choi ................... H01M 10/643

FOREIGN PATENT DOCUMENTS

CN 102244216 A 11/2011
CN 105914320 A 8/2016
(Continued)

OTHER PUBLICATIONS

European Search Report in European application No. 21901823.1 mailed on Mar. 18, 2024.
(Continued)

*Primary Examiner* — Holly Rickman
(74) *Attorney, Agent, or Firm* — PV IP PC; Christopher S. Ruprecht; Wei Te Chung

(57) ABSTRACT

A cylindrical battery module including at least two rows of cell assemblies, two brackets, and a cooling plate is provided. The cell assemblies in each row include cylindrical cells arranged along a first direction. The brackets are disposed at two sides of the cell assemblies along a second direction. The bracket is provided with fixing holes, and the cylindrical cell is plugged into two fixing holes on the brackets. The cooling plate is clamped between adjacent rows of the cell assemblies. The cooling plate is provided with arc grooves arranged at intervals and along the first direction. A first inserting portion is formed between two adjacent arc grooves. The arc grooves are respectively mated with the cylindrical cells of the cell assemblies in one row, and the first inserting portion is inserted into a gap between two adjacent cylindrical cells of the cell assemblies in the one row.

20 Claims, 6 Drawing Sheets

(51) Int. Cl.

| | |
|---|---|
| *H01M 10/643* | (2014.01) |
| *H01M 10/6557* | (2014.01) |
| *H01M 10/658* | (2014.01) |
| *H01M 50/284* | (2021.01) |
| *H01M 50/507* | (2021.01) |

(52) U.S. Cl.

CPC ..... *H01M 10/6557* (2015.04); *H01M 10/658* (2015.04); *H01M 50/284* (2021.01); *H01M 50/507* (2021.01)

(58) Field of Classification Search

CPC . H01M 50/284; H01M 50/507; H01M 50/258

See application file for complete search history.

(56) References Cited

FOREIGN PATENT DOCUMENTS

| | | | |
|---|---|---|---|
| CN | 106711542 | A | 5/2017 |
| CN | 208298909 | U | 12/2018 |
| CN | 209418724 | U | 9/2019 |
| CN | 209544431 | U | 10/2019 |
| CN | 110718726 | A | 1/2020 |
| CN | 210640339 | U | 5/2020 |
| CN | 210640340 | U | 5/2020 |
| CN | 211017184 | U | 7/2020 |
| CN | 214043835 | U | 8/2021 |
| GB | 2577260 | A | 3/2020 |
| JP | 2007066773 | A | 3/2007 |
| JP | 2012009388 | A | 1/2012 |
| WO | 2007076985 | A2 | 7/2007 |

OTHER PUBLICATIONS

Chinese Office Action issued in corresponding Chinese Patent Application No. 202011444095.8 dated Jun. 6, 2024.

International Search Report in International application No. PCT/CN2021/074987, mailed on Feb. 3, 2021.

Written Opinion of the International Search Authority in International application No. PCT/CN2021/074987, mailed on Feb. 3, 2021.

* cited by examiner

CYLINDRICAL BATTERY MODULE

CROSS REFERENCE TO RELATED APPLICATION

This application is a national stage of International Application No. PCT/CN2021/074987, filed on Feb. 3, 2021, which claims priority to Chinese Patent Application No. 202011444095.8, filed on Dec. 8, 2022. The aforementioned application is herein incorporated by reference in its entirety.

TECHNICAL FIELD

The present disclosure relates to the technical field of battery technologies, for example, to a cylindrical battery module.

BACKGROUND

In related technologies, a cylindrical battery module consists of a plurality of cylindrical cells in a connection of multi-parallels or multi-series. The cylindrical battery module includes a skeleton, the skeleton is opened with through holes, and the cylindrical cells are installed on the through holes, thus a volume is relatively large, which is not conducive to a spatial arrangement of a battery system and affects an energy density of the battery system. Fixed frames in existing structures are complex, which further increases the volume of the cylindrical battery module and is inconvenient to assemble, thereby lifting high production costs. In addition, during an operation of the battery module, due to a large heat generation, there are greater safety risks, which affects safety of the cylindrical battery module, and cooling devices in existing structures have large structures, which will further affect the volume of the cylindrical battery module. Due to a large number of the cells, problems such as cell fixation, cell protection, and cell cooling have increased difficulty of solving.

SUMMARY

A cylindrical battery module is provided in the present disclosure, in which, a space utilization can be improved, an energy density of the cylindrical battery module is increased, and a cooling effect is improved.

A cylindrical battery module is provided in an embodiment, the cylindrical battery module includes:

at least two rows of cell assemblies, the cell assemblies in each row including a plurality of cylindrical cells arranged along a first direction;

two brackets disposed at two sides of the at least two rows of cell assemblies along a second direction, each of the brackets being provided with a plurality of fixing holes, and each of the cylindrical cells being plugged into two corresponding ones of the fixing holes on the two brackets; and a cooling plate clamped between adjacent rows of the cell assemblies, the cooling plate being provided with a plurality of arc grooves arranged at intervals and along the first direction, a first inserting portion formed between two adjacent ones of the arc grooves, the plurality of arc grooves respectively mated with the plurality of cylindrical cells of the cell assemblies in one row, and the first inserting portion inserted into a gap between two adjacent ones of the cylindrical cells of the cell assemblies in the one row.

Figure 1:
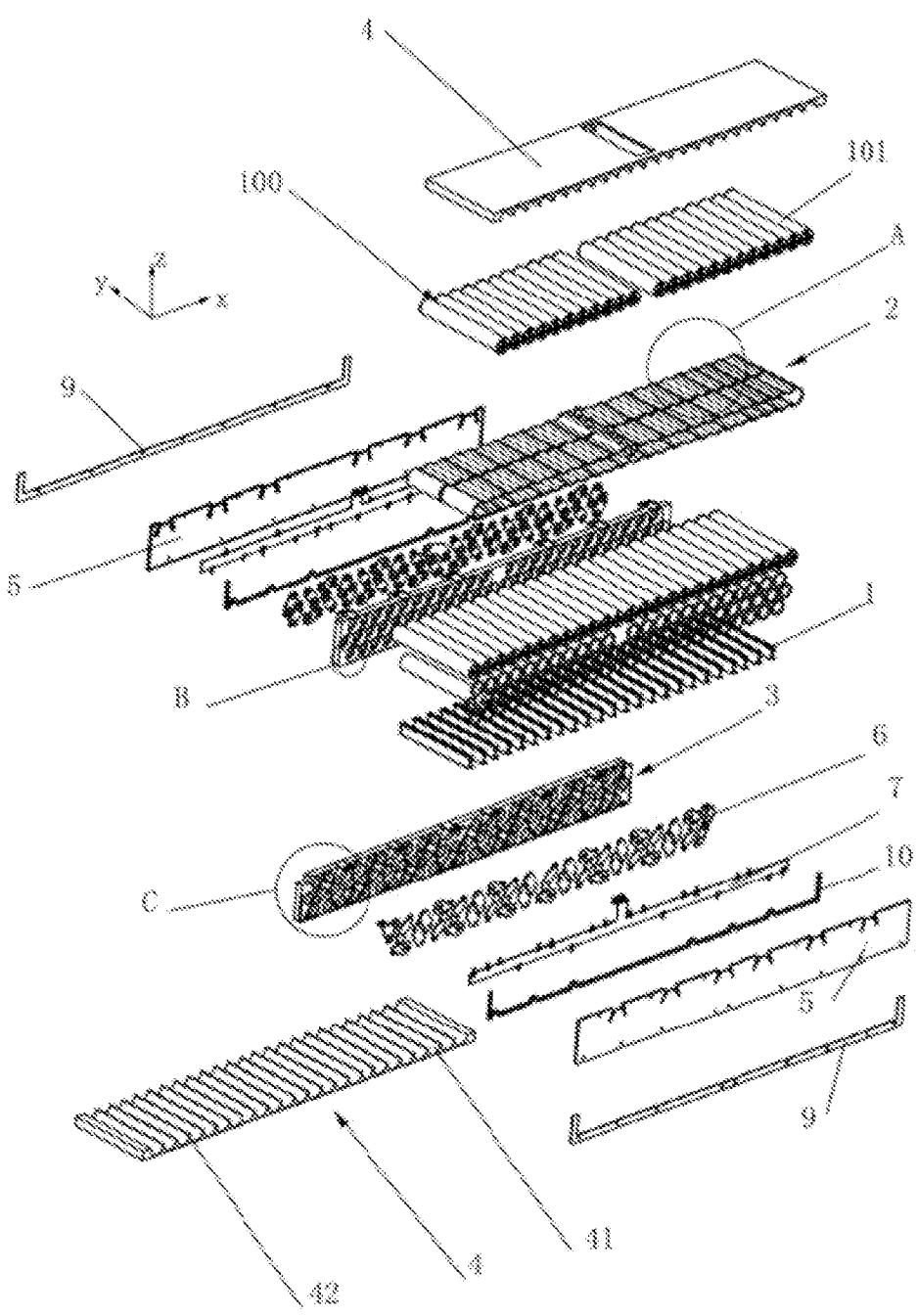
FIG. 1 is an exposed view of a cylindrical battery module provided in an embodiment of the present disclosure.

REFERENCE NUMERALS 100, cell assembly; 101, cylindrical cell;

1, keel; 11, lightening hole; 12, buckle; 13, circular groove;

2, cooling plate; 21, arc groove; 22, first inserting portion; 23, port; 241, first pipe; 242, second pipe; 25, tube coupling assembly; 251, first water inlet coupling; 252, first water outlet coupling; 253, second water inlet coupling; 254, second water outlet coupling; 26, water chamber; 261, first partial chamber; 262, second partial chamber; 263, third partial chamber; 264, fourth partial chamber; 265, first partition; 266, second partition; 267, first subsection; 268, second subsection; 271, inlet end; 272, outlet end;

3, bracket; 31, fixing hole; 311, gluey groove; 312, second structural adhesive layer; 32, connecting piece; 33, insulating bar;

4, cover plate; 41, recess; 42, second inserting portion;

5, insulation sheet;

6, busbar;

7, FPC board;

81, positive output pole;

9, metal reinforcing sheet;

10, sealing member.

DETAILED DESCRIPTION OF THE EMBODIMENT

In description of the present disclosure, unless otherwise specified and defined, terms "connected with", "connected" and "fixed" should be understood in a broad sense, for example, it may be a fixed connection, a detachable connection, or a whole; it may be a mechanical connection or an electrical connection; it may be a directly connection or an indirectly connection through an intermediate media; and it may be an internal communication of two components or an interaction relationship between two components. For those skilled in the art, meanings of the above terms in the present disclosure can be understood according to situations.

In the present disclosure, unless otherwise specified and defined, a first feature is disposed "on" or "under" a second feature may include a direct contact between the first feature and the second feature, or a contact between the first feature and the second feature through other features rather than the direct contact. Moreover, that the first feature is disposed "up", "above", and "on" the second feature includes that the first feature is right above or obliquely above the second feature, or only indicate that a horizontal height of the first feature is greater than a horizontal height of the second feature. That the first feature is disposed "under", "below", or "underneath" of the second feature include that the first feature is right below or obliquely below the second feature, or only indicate that the horizontal height of the first feature is less than the horizontal height of the second feature.

A cylindrical battery module is provided in the embodiment. The cylindrical battery module includes at least two rows of cell assemblies 100, two brackets 3, and a cooling plate 2. As showing in FIG. 1 to FIG. 3, the cell assemblies 100 in each row include a plurality of cylindrical cells 101 arranged along a first direction. The two brackets 3 are disposed at two sides of the cell assemblies 100 along a second direction. A plurality of fixing holes 31 are defined on the brackets 3. Each of the cylindrical cells 101 is simultaneously plugged into corresponding ones of the fixing holes 31 on the two brackets 3. The cooling plate 2 is clamped between adjacent rows of the cell assemblies 100. The cooling plate 2 is provided with a plurality of arc grooves 21 arranged at intervals and along the first direction. A first inserting portion is formed between two adjacent arc grooves 21. The arc grooves 21 are mated with the cylindrical cells 101 of the cell assemblies 100 in one row, and the first inserting portion is inserted into a gap between two adjacent cylindrical cells 101 of the cell assemblies 100 in the one row.

The two brackets 3 are oppositely disposed on both sides of the cylindrical cell 101. The fixing holes 31 provided on the two brackets 3 are corresponding. The cylindrical cell 101 is plugged into two fixing holes 31, thereby achieving a fixation of the cylindrical cell 101. A number of the brackets 3 may also be more than two, where more than two brackets also include two brackets. In an embodiment, as long as the fixing holes 31 on the two brackets 3 are arranged opposite to each other, so that both ends of the cylindrical cell 101 can be plugged into the corresponding fixing holes 31, and a relationship between the second direction and the first direction is not limited. When the cylindrical cells 101 are not arranged neatly, the fixing holes 31 on the brackets 3 need to be adaptively adjusted according to an arrangement of the cylindrical cells to facilitate plugging and fixation. Optionally, as shown in FIG. 1, the second direction is perpendicular to the first direction, the first direction is x direction, and the second direction is y direction. The cylindrical cells 101 are neatly arranged, the brackets 3 are vertically disposed on both sides of the cylindrical cell 101 along the second direction, and the brackets 3 are provided with the fixing holes 31 neatly arranged, which is convenient for processing the fixing holes 31 and easy to assemble. The brackets 3 are configured to fix the plurality of cylindrical cells 101 of the cell assemblies 100, and the cylindrical cells 101 are plugged with the brackets 3, thereby simplifying structures of the brackets 3 and facilitating installation.

The cooling plate 2 is clamped between adjacent rows of the cell assemblies 100, so as to improve the cooling effect of the cell assemblies 100 in each row. Designs of the arc grooves 21 and the first inserting portions 22, on the one hand, increase contact areas between the cooling plate 2 and the cell assemblies 100 to improve the cooling effect, and on the other hand, achieve that the cell assemblies 100 can cooperate with the arc grooves 21 and the first inserting portions 22. It will not increase a volume of the cylindrical battery module and also play a limiting role for the cylindrical cells 101, so as to improve stability of the structures. A cooperation of the brackets 3 and the cooling plate 2 simplifies the structure of the cylindrical battery module, reduces an overall weight, and improves an energy density of the battery. In an embodiment, there is a gap between two adjacent cylindrical cells 101, and the gap can be understood as follows: one is that the cylindrical cells 101 are against each other, then tops of the two adjacent cylindrical cells 101 form an arc-shaped gap, and the other is that the two cylindrical cells 101 are not resisted, forming a gap. And accordingly, a shape of the first inserting portion 22 can be designed according to different gaps.

In order to make the cell assemblies 100 in each row cooling uniformly, any two adjacent rows of the cell assemblies 100 are provided with the cooling plate 2 therebetween, that is a number of layers of the cooling plates 2 is less than a number of rows of the cell assemblies 100, so as to improve a temperature uniformity of the cell assemblies 100 in each row and increase a service life of the cylindrical battery module. Flow paths in the layers of the cooling plates 2 can be arranged in parallel to improve cooling uniformity between different layers of the cooling plate 2. Optionally, the arc grooves 21 are tangent to the cylindrical cells 101 to increase contact areas between the arc grooves 21 and the cylindrical cells 101, thereby improving the cooling effect and improving a space utilization.

In related technologies, the cooling plate is plate-shaped, a water inlet port and a water outlet port connected with an external cooling system are disposed on both sides. The water inlet port and the water outlet port occupy certain spaces, which reduces the space utilization of the battery module. In addition, the water inlet port and the water outlet port are respectively connected to tube couplings through water chambers, and a number of the water chambers is large, which increases a risk of liquid leakage and increases production costs.

Figure 7:
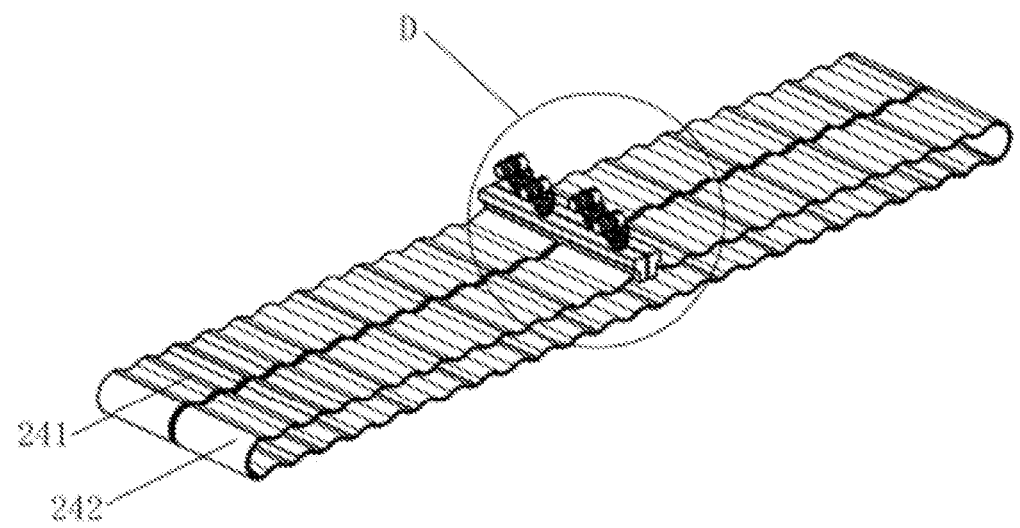
FIG. 7 is a schematic structural view of a water-cooled unit provided in an embodiment of the present disclosure.
Figure 8:
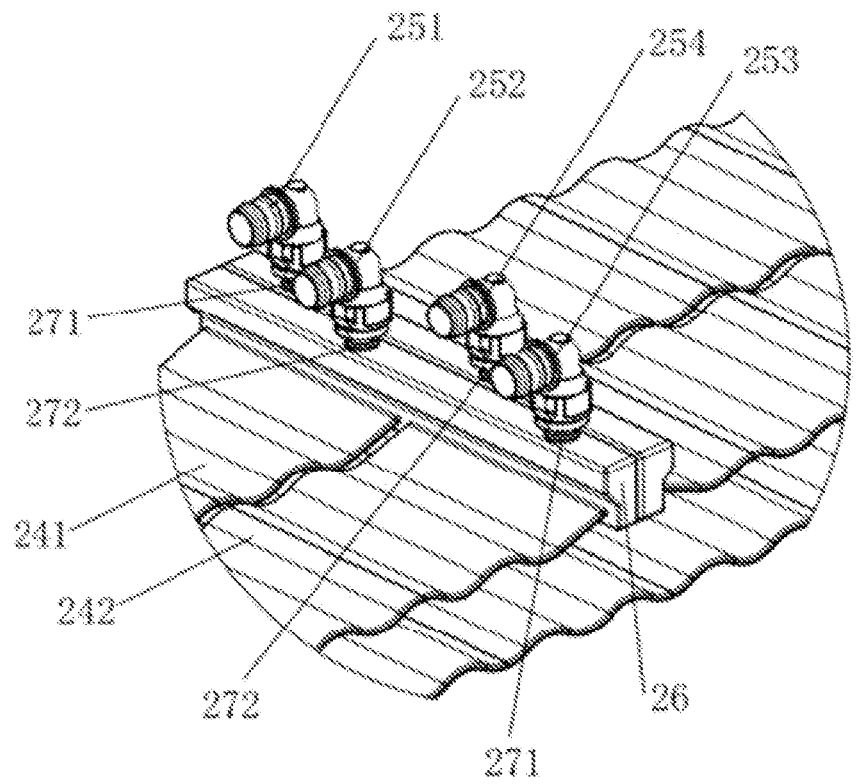
FIG. 8 is an enlarged view of a part D in FIG. 7.

To solve the above problems, as shown in FIG. 1, FIG. 7, and FIG. 8, the cooling plate 2 is annular, an inlet end 271 and an outlet end 272 of the cooling plate 2 are designed to be adjacent, and the inlet end 271 and outlet end 272 are provided in a middle portion of the cooling plate 2. The inlet end 271 and outlet end 272 are centrally located in the middle portion of the annular cooling plate 2, which saves the space and improves the space utilization of the battery module. In an embodiment, the cooling plate 2 is provided with a tube coupling assembly 25 and a water chamber 26 (referring to FIG. 8 and FIG. 9), the tube coupling assembly 25 includes at least two tube couplings, each of the tube couplings is correspondingly communicated with one of a water inlet port disposed at the inlet end 271 and a water outlet port disposed at the outlet end 272. The water chamber 26 communicates the inlet end 271, the outlet end 272, and the tube coupling assembly 25. An inner space of the water chamber 26 is divided into at least two partial chambers, and each of the partial chambers is correspondingly communicated with one of the water inlet port and the water outlet port.

The inlet end 271 and the outlet end 272 of the annular cooling plate 2 are connected to a same water chamber 26, so as to reduce a number of the water chamber 26, thereby simplifying the structure, simplifying the assembly of the water chamber 26 and the cooling plate 2, and reducing the costs. Reduced connection of the water chamber 26 to the cooling plate 2 reduces a risk of the liquid leakage and improves the reliability in use. Reduced number of the water chamber 26 saves the space. Optionally, the water chamber 26 is disposed on the middle portion of the cooling plate 2. When a water-cooled unit is installed on the battery module, and when adjacent rows of the cell assemblies 100 are provided close to the cooling plate 2, the water chamber 26 may be disposed between two cylindrical cells 101 of the adjacent rows of the cell assemblies 100 to reduce the space occupied by the water chamber 26 and improve the space utilization. Optionally, the water chamber 26 is welded with the cooling plate 2 to increase a connection strength. Reduced number of the water chamber 26 can reduce welding operations and thus reduce the costs. In an embodiment, the "annular" shape may be a runway or a waist circle. The cooling plate 2, the tube coupling assembly 25, and the water chamber 26 form the water-cooled unit, and the water-cooled unit can also be used separately in other battery modules.

Optionally, the cooling plate 2 includes at least two pipes, and the pipes are arranged side-by-side along a length direction of the cylindrical cell 101 to increase a width of the cooling plate 2. A coolant in the cooling plate 2 is thus diverted to improve a flow effect of the coolant, which in turn improves the cooling effect. In an embodiment, the water chamber 26 is divided into at least four partial chambers, each of the partial chambers in one part of the partial chambers is connected to one of the water inlet ports of all of the pipes, and each of the partial chambers of the other part of the partial chambers is connected to one of the water outlet ports of all of the pipes. When two pipes are provided on the cooling plate 2, the water chamber 26 is divided into four partial chambers, and the two water inlet ports and the two water outlet ports are respectively communicated with the four partial chambers one-to-one. Or, the water chamber 26 may also be divided into eight partial chambers, the eight partial chambers are divided into four groups, the partial chambers in the four groups are respectively communicated with the two water inlet ports and the two water outlet ports one by one. A number of the partial chambers in each group can be different, so the partial chambers can be designed according to the needs of use. As long as that the water inlet port and the water outlet port of each pipes can be communicated with different partial chambers, and others are not limited.

As a length of the battery module increases, a length of the cooling plate 2 may also be increased at a same time. When the length of the cooling plate 2 is too long, the cooling effect of the cooling plate 2 on different cylindrical cells 101 will be uneven. For this reason, in the embodiment, the water inlet port of one pipe and the water outlet port of adjacent pipe are alternately disposed at a same end of the cooling plate 2, so that cooling water in the two adjacent pipes circulates in opposite directions, and a same cylindrical cell 101 may be cooled simultaneously by a head of one pipe and a tail of another pipe, thereby improving a cooling uniformity of different cylindrical cells 101 and reducing a temperature difference between different cylindrical cells 101.

Figure 11:
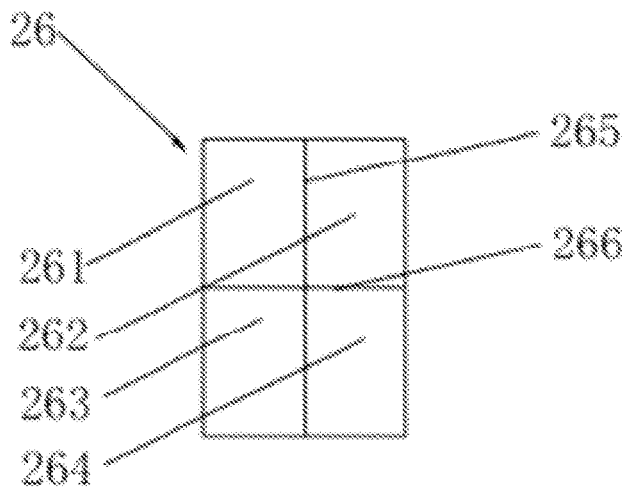
FIG. 11 is a schematic structural view showing an internal structure of a water chamber provided in an embodiment of the present disclosure.

Optionally, the water chamber 26 includes two column chambers, each of the column chambers is respectively connected to the inlet end 271 and outlet end 272. Each of the column chambers includes a plurality of partial chambers, each of the partial chamber of one of the column chambers is communicated with a first end of a corresponding one of the pipes near the corresponding column chamber, and each of the partial chambers in the other one of the column chambers is communicated with a second end of a corresponding one of the pipes. Structures of the partial chambers are simple, which is convenient for the partial chambers to communicate with the water inlet ports and the water outlet ports of the pipes. In the embodiment, as shown in FIG. 11, the water chamber 26 includes a first partition 265 and a second partition 266. The first partition 265 divides the water chamber into two columns of large partial chambers, and the second partition 266 divides each column of the large partial chambers into two partial chambers. Depending on the number of the pipes, a plurality of the second partitions 266 may be provided on the water chamber 266 to divide each of the large partial chambers into a plurality of partial chambers.

In the embodiment, as shown in FIG. 7, FIG. 8, and FIG. 11, the cooling plate 2 includes a first pipe 241 and a second pipe 242. The outlet end 272 and the inlet end 271 of the first pipe 241 are respectively connected to a first water outlet coupling 252 and a first water inlet coupling 251. The outlet end 272 and the inlet end 271 of the second pipe 242 are respectively connected to a second water outlet coupling 254 and a second water inlet coupling 253. The water chamber 26 is divided into a first partial chamber 261, a second partial chamber 262, a third partial chamber 263, and a fourth partial chamber 264. The first partial chamber 261 and the third partial chamber 263 are provided close to the first ends of the pipes, and the second partial chamber 262 and the fourth partial chamber 264 are provided close to the second ends of the pipes. The first partial chamber 261 is communicated with the first outlet coupling 252 and the water outlet port of the first pipe 241, respectively. The second partial chamber 262 is communicated with the first inlet coupling 251 and the water inlet port of the first pipe 241, respectively. The third partial chamber 263 is communicated with the second inlet coupling 253 and the water inlet port of the second pipe 242, respectively. The fourth partial chamber 264 is communicated with the second outlet coupling 254 and the water outlet port of the second pipe 242, respectively. The structure is simple, and the coolants in the first pipe 241 and the second pipe 242 circulate in opposite directions, thereby improving the cooling effect on the cylindrical cells 101.

Figure 9:
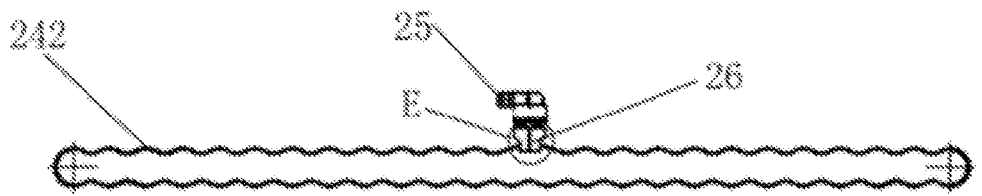
FIG. 9 is lateral view of the water-cooled unit provided in an embodiment of the present disclosure.
Figure 10:
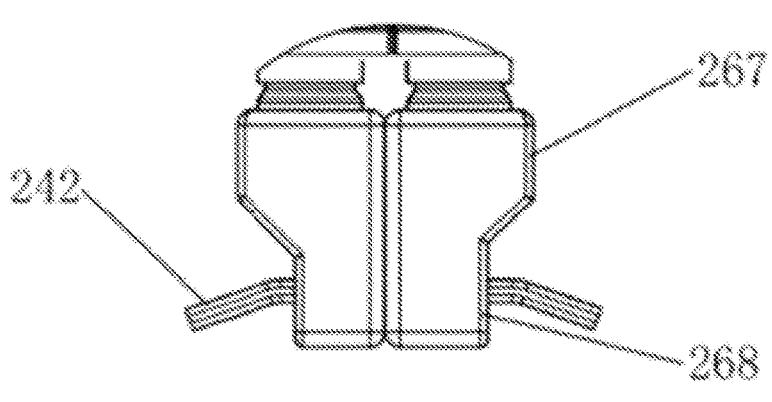
FIG. 10 is an enlarged view of a part E in FIG. 9.

Optionally, the water chamber 26 includes liquid inlets communicated with the tube couplings and liquid outlets communicated with the cooling plate 2. An inner diameter of the liquid inlet is greater than an inner diameter of the liquid outlet. When the coolant flows from the external cooling system to the cooling plate 2, the water chamber 26 plays a buffering role to reduce an impact force of the coolant acting on the cooling plate 2. In the embodiment, as shown in FIG. 9 and FIG. 10, the water chamber 26 includes a first subsection 267 and a second subsection 268. The liquid inlets are provided on the first subsection 267, and the liquid outlets are provided on the second subsection 268. An internal volume of the first subsection 267 is greater than an internal volume of the second subsection 268, and the first subsection 267 and the second subsection 268 can be connected by inclined plates. Optionally, the first subsection 267 and the second subsection 268 may also be connected by circular arc plates, and the circular arc plates can be mated with the cylindrical cells 101 to improve the space utilization. In other embodiments, the water chamber 26 may also be provided as a funnel-shaped structure, which is not limited here.

Figure 2:
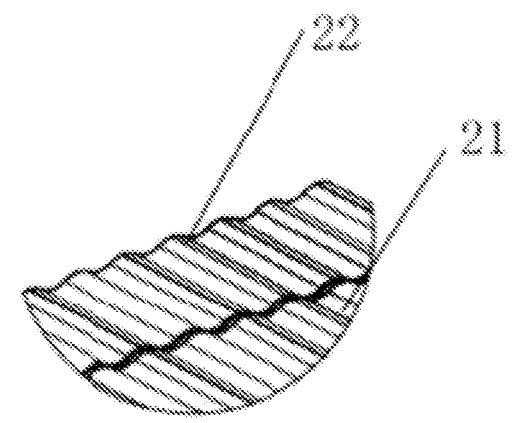
FIG. 2 is an enlarged view of a part A in FIG. 1.

Optionally, the cooling plate 2 is provided with arc grooves configured to be mated with the cylindrical cells 101, so as to reduce the space occupied by the cooling plate 2 and improve the space utilization of the battery module. As shown in FIG. 2, the arc grooves 21 are alternately provided on both sides of the cooling plate 2. The arc grooves 21 on both sides of the cooling plate 2 are respectively mated with the cylindrical cells 101 of two adjacent rows of the cell assemblies 100. A section of the cooling plate 2 is a wavy shape, the arc grooves 21 on a first side form the first inserting portions 22 on a second side, and the arc grooves 21 on the second side form the first inserting portions 22 on the first side, so that full use of the structure of the cooling plate 2 are made and a thickness of the cooling plate 2 is reduced, thereby reducing the volume of the battery module. When the volume of the cylindrical battery module is fixed, the space utilization of the cylindrical cells 101 is improved, and the energy density of the cylindrical battery module is improved.

Optionally, contact radians between the cylindrical cells 101 and the arc grooves 21 range from 55° to 65°. The contact radian of the arc groove 21 is a central angle of an arc surface of the arc groove 21 and ranges from 55° to 65°, so as to avoid excessive contact radians which reduce the space utilization along the first direction, and further to avoid too small contact radians which reduce the space utilization along an arrangement direction of the cell assemblies. Optionally, the contact radians may be 60°.

In order to reduce a risk of leakage between the battery cells and the water-cooled unit, in the embodiment, the cooling plate 2 made of an insulating material is adopted. Optionally, the material of the cooling plate 2 may be a metal material such as aluminum or stainless steel, which can improve the structural strength and improve the reliability of use. Optionally, when the material of the cooling plate 2 is the metal material, the cooling plate 2 is equipped with an insulating layer, which further improves an insulation performance of the cooling plate 2 and effectively reduces the risk of leakage.

In other embodiments, surfaces of the cooling plate 2 may also be provided with insulating paint layers to prevent from conducting with the cooling plate 2 in case of leakage of the cylindrical cells 101, so as to improve safety. In an embodiment, a third structural adhesive layer is further provided on the insulating paint layers, so that the cooling plate 2 is bonded with the cylindrical cells 101 to improve connection strength.

In an embodiment, the brackets 3 may be made of plastic materials, both to meet a strength requirement, but also to reduce a weight, thereby increasing the energy density of the cylindrical battery module.

In order to improve stability of a relative installation between two adjacent cylindrical cells 101, optionally, a packing structure may be sealant structures. The cylindrical cells 101 are filled by sealants therebetween, and the cylindrical cells 101 are fixed by forming the sealant structures. Optionally, the packing structure may also be keels 1. Two adjacent cylindrical cells 101 of the cell assemblies 100 in at least one row are provided with one of the keels 1 therebetween, and a first structural adhesive layer is provided between the keels 1 and the cylindrical cells 101. The first structural adhesive layer bonds the keels 1 and the cylindrical cells 101, thereby improving the structural strength between the cylindrical cells 101, reducing gluing, and increasing productivity.

Figure 12:
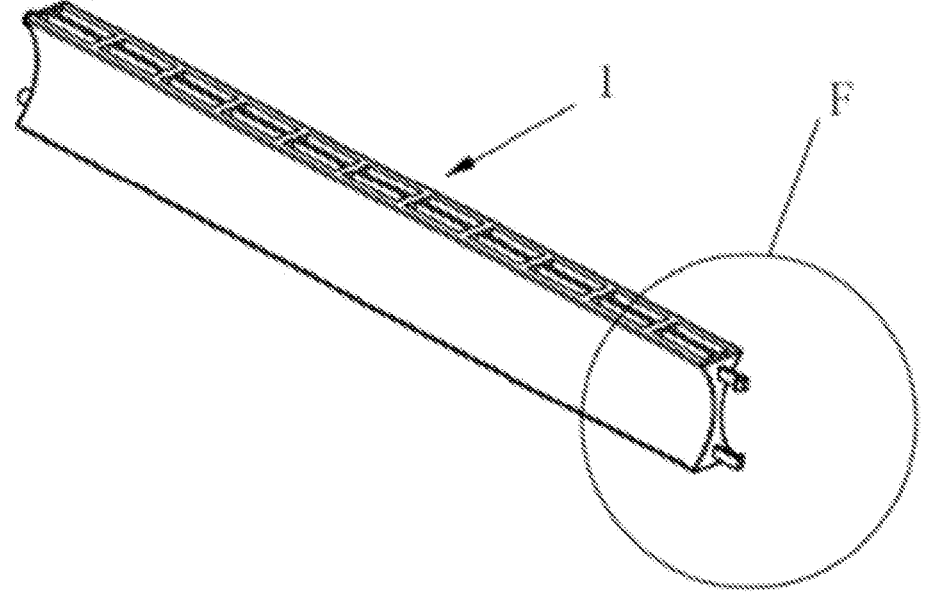
FIG. 12 is a schematic structural view of a keel provided in an embodiment of the present disclosure.
Figure 13:
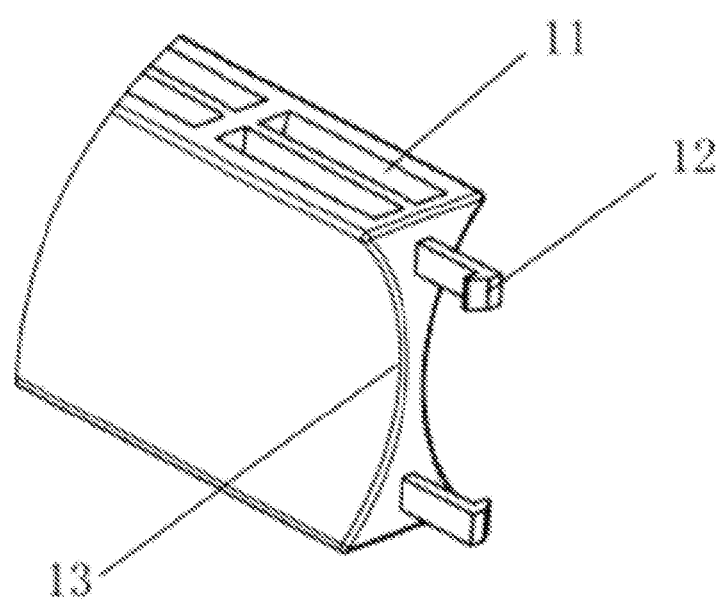
FIG. 13 is an enlarged view of a part F in FIG. 12.

As shown in FIG. 12 and FIG. 13, a length of keel 1 is adapted to a length of the cylindrical cell 101, so as to increase contact areas and improving installation stability. Optionally, the keel 1 is provided with circular grooves 13 matched with the cylindrical cells 101 along a width direction. The circular groove 13 fits with a periphery of the cylindrical cell 101 to increase a contact area and improve the installation stability, so as to reduce a volume of keel 1 at the same time, thereby reducing a volume occupied by the cylindrical cells 101 in an arrangement direction. Optionally, the keels 1 are hollow structures to reduce weights of the keels 1, which in turn reduces the weight of the cylindrical battery module. In an embodiment, the keel 1 is provided with a plurality of lightening holes 11 along a height direction, which is convenient for processing. The lightening hole 11 may be a square hole or a circular hole, etc., may be a through-hole or a blind hole, and is set according to actual needs.

During assembly, surfaces of the keels 1 may first be glued to form the first structural adhesive layer, and then the keels 1 are installed. Optionally, hollow recesses are defined on the arc grooves 13 of the keels 1 matched with the cylindrical cells 101. When gluing, the hollow recesses are glued and then bonded with the cylindrical cells 101. The hollow recesses can not only support the keels 1, avoid deformation of the keels 1, but also provide a gluing space for the first structural adhesive layer, which is convenient for glue positioning and the assembly of the keels 1.

Optionally, both ends of the keel 1 along a length direction may be bonded to the brackets 3 to improve the structural strength. Optionally, referring to FIG. 12 and FIG. 13, the both ends of the keel 1 along the length direction are respectively provided with buckles. Correspondingly, the brackets 3 are provided with slots, and the buckles are connected to the slots, so that a detachable connection between the keel 1 and the brackets 3 is formed through a clamp mode of of the buckles, which is convenient for structural disassembly. In an embodiment, each end of the keels 1 can be provided with two buckles 12, and the two buckles 12 are connected in opposite splice directions, avoiding loosening between the buckles 12 and the slots during movement in one direction, further improving reliability of connection between the keels 1 and the brackets 3.

Figure 6:
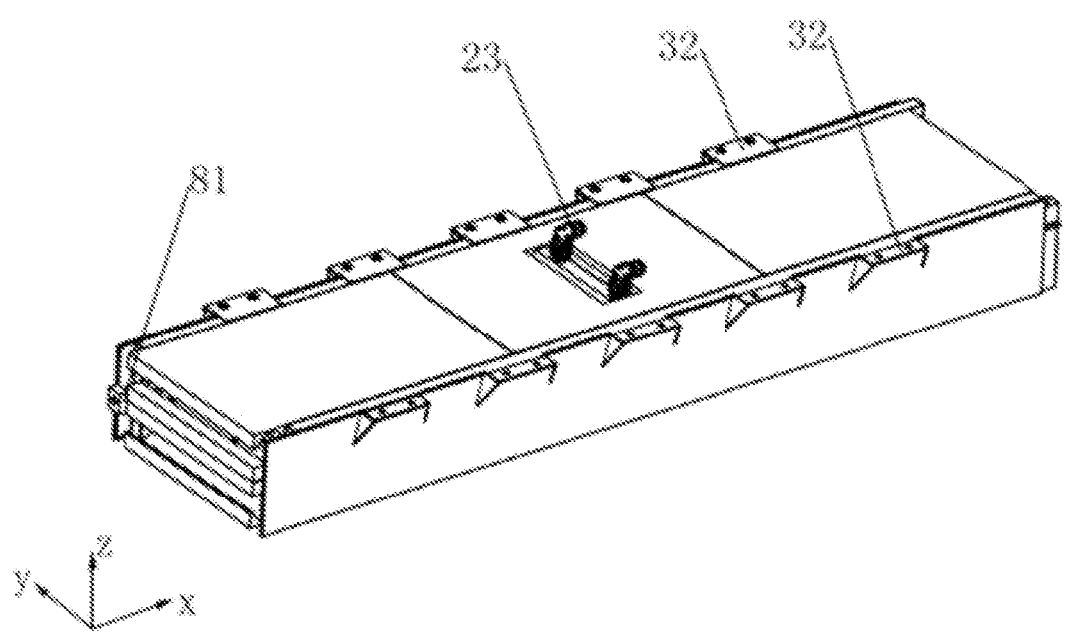
FIG. 6 is a schematic structural view of the cylindrical battery module provided in an embodiment of the present disclosure.

Optionally, the cylindrical battery module further includes cover plates 4. The cover plates 4 are disposed at end portions of the cell assemblies 100 along a third direction, so as to prevent external structures from causing impact damage to the cell assemblies 100. The cover plates 4 may be adaptively set according to a specific arrangement structure of the cell assemblies 100. In the embodiment, as shown in FIG. 1 and FIG. 6, the cell assemblies 100 are neatly arranged, the third direction is z direction, and the third direction is perpendicular to the first direction and the second direction, so as to facilitate assembly.

In the embodiment, the cell assemblies 100 includes cell assemblies 100 arranged in first rows adjacent to the cover plates 4. When two adjacent cylindrical cells 101 of the cell assemblies 100 in the first row are not provided with the packing structure therebetween, the cover plate 4 is provided with a plurality of recesses 41, and a second inserting portion 42 is formed between two adjacent recesses 41. The recesses 41 are mated with the cylindrical cells 101, and the second inserting portion 42 is inserted into the gap between two adjacent cylindrical cells 101. The second inserting portions 42 and the recesses 41 on the cover plates 4 are mated with the cylindrical cells 101, so that the second inserting portions 42 and the recesses 41 can replace the keels 1 or the sealant structures as fillers, and are also configured to limit the cylindrical cells 101, and to play a role in improving the structural strength between the cylindrical cells 101. Referring to FIG. 1, in the embodiment, the cylindrical battery module includes two cover plates 4 disposed at an upper end and a lower end of a plurality rows of the cell assemblies 100 along the third direction. The cell assemblies 100 in an upper row and the cell assemblies 100 in a lower row are limited and strengthened by the cover plates 4, and the cell assemblies 100 in middle rows can be secured by the keels 1 or the sealant structures. At the same time, the upper and lower cover plates 4 further protect the cell assemblies 100.

In other embodiments, the cell assemblies 100 includes cell assemblies 100 arranged in first rows adjacent to the cover plates 4. When two adjacent cylindrical cells 101 of the cell assemblies 100 in the first row are provided with the packing structure such as the keels 1 or the sealant structures therebetween, the cover plates 4 are flat plates. The keels 1 or the sealant structures are provided between the cell assemblies 100 in each row, so that the cell assemblies 100 in each row have same structures, so that structures of the cover plates 4 are simple and easy to produce, thereby reducing costs.

In an embodiment, the cover plates 4 may be made of plastic materials, both to meet strength requirements, but also to reduce weight and increase the energy density of the cylindrical battery module.

Optionally, the cylindrical battery module includes at least three rows of cell assemblies 100, and the cooling plate 2 includes a first cooling plate and a second cooling plate. In the embodiment, the first cooling plate and the second cooling plate are an upper layer and a lower layer of the annular cooling plate 2. The cell assemblies 100 in the first row is disposed between the cover plate 4 and the first cooling plate, and a contact area between the first cooling plate and the cell assemblies 100 in the first row is a first contact area S1. The cell assemblies 100 in a second row is disposed between the first cooling plate and the second cooling plate, and a contact area between the first cooling plate and the cell assemblies 100 in the second row is a second contact area S2. Among them, S1>S2. Since the cell assemblies 100 in the second row are cooled simultaneously through a double-sided cooling plate 2, the cooling effect is stronger than that of the cell assemblies 100 in the first row cooled only by a single-side cooling plate 2, cooling uniformity is improved by adjusting the contact area between the cell assemblies 100 in the first row and the cold plate 2 and the contact area between the cell assemblies 100 in the second row and the cold plate 2. In an embodiment, heat insulation members are provided on the arc grooves 21 of the first cooling plate adjacent to the cell assemblies 100 in the second row to change contact angles between the cell assembly 100 in the second row and two adjacent arc grooves 21, so as to reduce the contact area between the cell assemblies 100 in the second row and the cold plate 2 and reduce the cooling effect, thereby improving the cooling uniformity between the cell assemblies 100 in the second row and the cell assemblies 100 in the first row. Optionally, the heat insulation members may be plastic insulation sheets bonded to the arc grooves 21. Sizes of the heat insulation members can be designed according to thermal simulation calculations, etc., and the heat insulation members can also be thermal insulation coatings, which will not be repeated.

Figure 3:
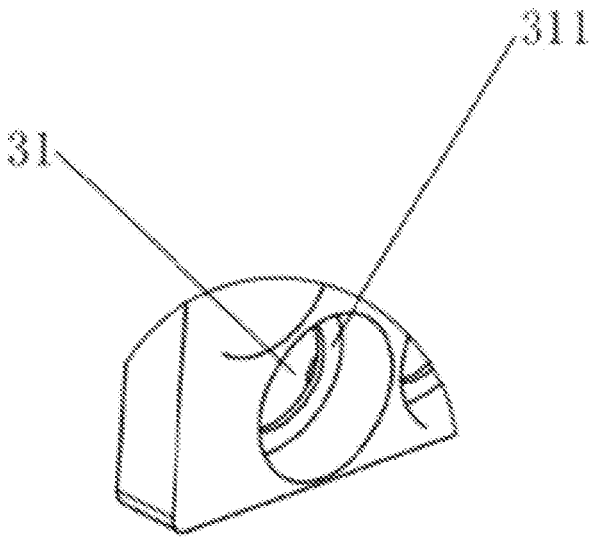
FIG. 3 is an enlarged view of a part B in FIG. 1.
Figure 4:
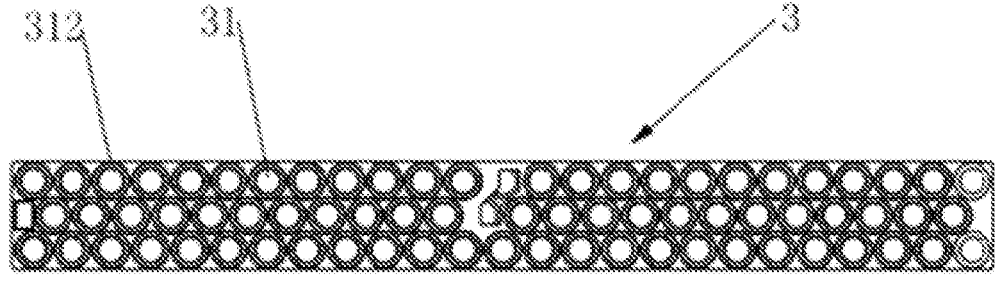
FIG. 4 is a schematic structural view of a second structural adhesive layer provided on a bracket in an embodiment of the present disclosure.
Figure 5:
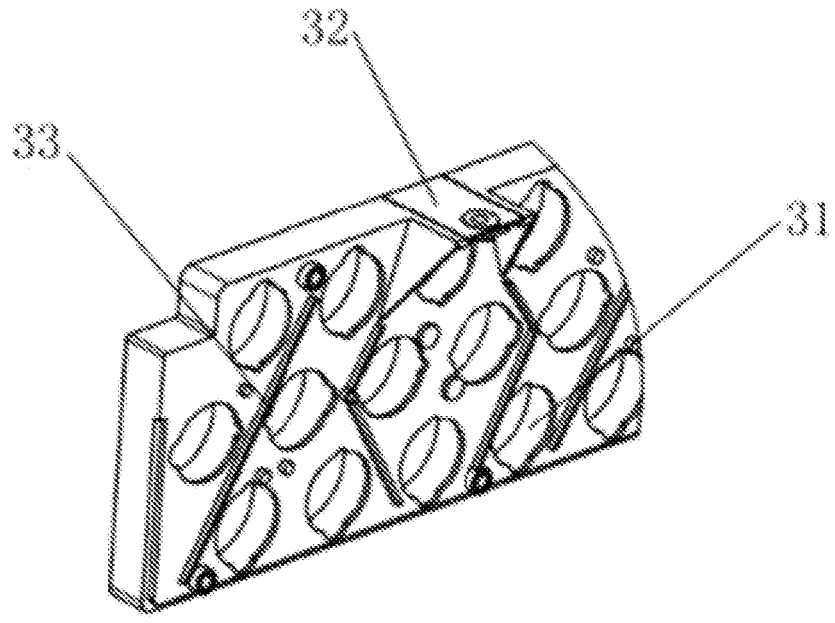
FIG. 5 is an enlarged view of a part C in FIG. 1.

Optionally, the cylindrical cells 101 and the fixing holes 31 are bonded or detachably connected, so as to improve connection strength between the cell assemblies 100 and brackets 3. In the embodiment, as shown in FIG. 3 to FIG. 5, sides of the fixing holes 31 adjacent to the cylindrical cells 101 are provided with gluey grooves 311, a second structural adhesive layer 312 is disposed on the gluey grooves 311, and the cylindrical cells 101 are connected to the fixing holes 31 through the second structural adhesive layer 312, so as to improve the connection strength between the cylindrical cells 101 and brackets 3. In an embodiment, glue may be driven into the gluey grooves 311 by a gluing device to form the second structural adhesive layer 312, and then the cylindrical cells 101 are installed on the fixing holes 31, and then the second structural adhesive layer 312 cures naturally. Optionally, the second structural adhesive layer 312 may be disposed on bottom walls of the gluey grooves 311, so that the cylindrical cells 101 are bonded to the bottom walls. The second structural adhesive layer 312 may also be disposed on sidewalls of the gluey grooves 311, so that the cylindrical cells 101 are bonded to the sidewalls. In other embodiments, the fixing holes 31 may also be provided with buckles, and the cylindrical cells 101 and brackets 3 are matched by the clamp mode of the buckles.

Optionally, as shown in FIG. 1, FIG. 5, and FIG. 6, both sides of the bracket 3 are provided with connecting pieces 32 configured to connect with external boxes. The cylindrical battery module is fixedly connected with the external boxes by the connecting pieces 32 on both sides, so as to improve the installation stability of the cylindrical battery module. In an embodiment, the connecting pieces 32 are provided with through holes through which fasteners are passed to secure the cylindrical battery module to structures such as the external boxes. In the embodiment, the connecting pieces 32 and bracket 3 are integrated structures, so as to increase structural strength of connecting pieces 32. In other embodiments, the connecting pieces 32 and bracket 3 may also be split structures, the connecting pieces 32 may be bonded or connected to corresponding brackets 3 by fasteners, or the connecting pieces 32 may be metal reinforcing sheets embedded in the corresponding brackets 3, which is easy to operate. Optionally, steel sleeves can be added to the connecting pieces 32, and the fasteners are connected to the outside through the steel sleeves to improve the structural strength and avoid wear of the connecting pieces during multiple disassembly.

Optionally, the cylindrical battery module further includes two insulation sheets 5 to improve insulation of the cylindrical battery module. The two insulation sheets 5 are respectively connected to the brackets 3 located at two sides to fix the insulation sheets 5. In an embodiment, the connecting pieces 32 and the insulation sheets 5 may be bonded, or connected by buckles or bolted, which is easy to disassemble. Optionally, sealing members 10 are also provided between the insulation sheets 5 and the brackets 3 to improve sealing property.

Optionally, the cylindrical battery module further includes busbars 6 disposed on two sides of the cell assemblies 100 along the second direction. The busbars 6 are welded to poles of the cylindrical cells 101. The brackets 3 are provided with slots, and the busbars 6 are disposed on the slots, such that connection structures of the busbars 6 are stable, which improves the performance of the cylindrical battery module. As shown in FIG. 5, the brackets 3 are provided with insulating bars 33, the insulating bars 33 are configured to form the slots configured to install the busbars 6, and the insulating bars 33 can insulate adjacent busbars 6 and provide convenient for positioning and installation. The insulating bars 33 may be bonded to the brackets 3.

Optionally, the cylindrical battery module further includes two FPC (Flexible Printed Circuit) boards 7. The two FPC boards 7 are respectively weld to the busbars 6 on corresponding sides. The two FPC boards 7 are respectively provided between the corresponding busbars 6 and the corresponding brackets 3, and the FPC boards 7 are fixedly connected to the brackets 3 on the corresponding sides, such as by hot riveting or welding processes, thereby improving the connection strength, simplifying the structure, and facilitating insulation protection. In an embodiment, laser welding may be used for welding.

As shown in FIG. 1 and FIG. 6, the cylindrical battery module further includes a positive output pole 81 and a negative output pole disposed at both ends. The positive output pole 81 and the negative output pole are respectively connected to the busbars 6 on both sides.

To improve the safety of use, optionally, the cylindrical battery module further includes a metal reinforcing sheet 9 and a compressed foam provided on both sides of the insulation sheet 5. The compressed foam is disposed between the bracket 3 and the insulation sheet 5, and the metal reinforcing sheet 9 is disposed on an outermost side to press the compressed foam to ensure a compression of the compressed foam. When the cylindrical cells 101 leak, the compressed foam will block leaked liquid from penetrating into electrical connections, thereby reducing a risk of short circuit, and other safety hazards.

Referring to FIG. 6, optionally, the cover plate 4 is provided with an opening, the cooling plate 2 is provided with two connection ports 23, they are the liquid inlet and the liquid outlet, and the two structures are respectively through the opening and connected to the external cooling system.

In the embodiment, the cylindrical battery module includes the cell assemblies 100 arranged in three rows. Optionally, assembly steps of the cylindrical battery module include:

S1, successively installing the lower cover plate 4, the cell assembly 100, the cooling plate 2, the cell assembly 100, and the upper cover plate 4. When multi-rows of the cell assemblies 100 are included, the layers of the cooling plate 2 and the rows of the cell assemblies 100 are installed alternately.

S2, gluing the keels 1, and installing the keels 1 between the plurality of cylindrical cells 101 of the cell assemblies 100.

S3, gluing the brackets 3.

S4, installing the bracket 3, the busbar 6, the FPC board 7, the compressed foam, the insulation sheet 5, the sealing member 10, and the metal reinforcing sheet 9 at one side in sequence.

S5, installing the bracket 3, the busbar 6, the FPC board 7, the compressed foam, the insulation sheet 5, the sealing member 10, and the metal reinforcing sheet 9 at the other side in sequence.

In the cylindrical battery module provided in the present disclosure, the brackets 3 are configured to fix the plurality of cylindrical cells 101 of the cell assemblies 100, and the cylindrical cells 101 and the brackets 3 are connected through a plug-in connection, which simplifies the structures of the brackets 3 and is easy to install. The cooling plate 2 is clamped between adjacent rows of the cell assemblies 100, which improves the cooling effect of the cell assemblies 100 in each row. The designs of the arc grooves 21 and the first inserting portions 22, on the one hand, increase the contact areas between the cooling plate 2 and the cell assemblies 100 to further improve the cooling effect, and on the other hand, achieve that the cell assemblies 100 can cooperate with the arc grooves 21 and the first inserting portions 22. It will not increase the volume of the cylindrical battery module and also play a limiting role for the cylindrical cells 101, thereby improving stability of the structures. The cooperation between the brackets 3 and the cooling plate 2 simplifies the structure of the cylindrical battery module, reduces the overall weight, and improves the energy density of the battery.

What is claimed is:

1. A cylindrical battery module, comprising:
   at least two rows of cell assemblies, the cell assemblies in each row comprising a plurality of cylindrical cells arranged along a first direction;
   two brackets disposed at two sides of the at least two rows of cell assemblies along a second direction, wherein each of the brackets is provided with a plurality of fixing holes, and each of the cylindrical cells is plugged into two corresponding ones of the fixing holes on the two brackets; and
   a cooling plate clamped between adjacent rows of the cell assemblies, wherein the cooling plate is provided with a plurality of arc grooves arranged at intervals and along the first direction, a first inserting portion is formed between two adjacent ones of the arc grooves, the plurality of arc grooves are respectively mated with the plurality of cylindrical cells of the cell assemblies in one row, and the first inserting portion is inserted into a gap between two adjacent ones of the cylindrical cells of the cell assemblies in the one row;
   wherein the cooling plate is annular, an inlet end and an outlet end of the cooling plate are disposed adjacent to each other, and both the inlet end and the outlet end are disposed at a middle portion of the cooling plate in the first direction.

2. The cylindrical battery module of claim 1, further comprising a packing structure, wherein the packing structure comprises keels, two adjacent ones of the cylindrical cells of the cell assemblies in at least one row are provided with one of the keels therebetween, and a first structural adhesive layer is provided between the keels and the cylindrical cells; or
   wherein the cylindrical battery module further comprises a packing structure, the packing structure comprises a plurality of sealant structures, and each of the sealant structures is filled between two adjacent ones of the cylindrical cells in at least one row of the cell assemblies.

3. The cylindrical battery module of claim 2, wherein the keels are hollow structures, and the keels and the brackets are detachably connected or bonded.

4. The cylindrical battery module of claim 1, further comprising cover plates, wherein the cover plates are disposed on end portions of the at least two rows of cell assemblies along a third direction, and the third direction is perpendicular to the first direction and the second direction.

5. The cylindrical battery module of claim 1, wherein the at least two rows of cell assemblies comprise cell assemblies arranged in first rows adjacent to the cover plates, the cover plates are provided with a plurality of recesses, a second inserting portion is formed between two adjacent ones of the recesses, the plurality of recesses are mated with the plurality of cylindrical cells, and the second inserting portion is inserted into the gap between two adjacent ones of the cylindrical cells.

6. The cylindrical battery module of claim 4, wherein the at least two rows of cell assemblies comprise cell assemblies arranged in first rows adjacent to the cover plates, and the cover plates are flat plates.

7. The cylindrical battery module of claim 4, wherein the cylindrical battery module comprises the cell assemblies arranged in at least three rows, the cooling plate comprises a first cooling plate and a second cooling plate; the cell assemblies in a first row are disposed between a corresponding one of the cover plate and the first cooling plate, a contact area between the first cooling plate and the cell assemblies in the first row is a first contact area; and the cell assemblies in a second row are disposed between the first cooling plate and the second cooling plate, a contact area between the first cooling plate and the cell assemblies in the second row is a second contact area; and the first contact area is greater than the second contact area.

8. The cylindrical battery module of claim 7, wherein heat insulation members are provided on the arc grooves of the first cooling plate adjacent to the cell assemblies in the second row.

9. The cylindrical battery module of claim 2, wherein the cylindrical cells and the fixing holes are bonded or detachably connected.

10. The cylindrical battery module of claim 9, wherein sides of the fixing holes adjacent to the cylindrical cells are provided with gluey grooves, a second structural adhesive layer is disposed on the gluey grooves, and the cylindrical cells are connected to the fixing holes through the second structural adhesive layer.

11. The cylindrical battery module of claim 2, further comprising busbars disposed on the two sides of the at least two rows of cell assemblies along the second direction, wherein the busbars are welded to poles of the cylindrical cells, the brackets are provided with slots, and the busbars are disposed on the slots.

12. The cylindrical battery module of claim 11, further comprising two flexible circuit FPC boards, each of the FPC boards is disposed between a corresponding one of the busbars and a corresponding one of the brackets, each of the FPC boards is welded to the corresponding one of the busbars and fixed with the corresponding one of the brackets.

13. The cylindrical battery module of claim 2, wherein the brackets are provided with connecting pieces configured to connect external boxes.

14. The cylindrical battery module of claim 13, further comprising two insulation sheets, wherein the two insulation sheets are respectively connected to the two brackets located at two sides of the two insulation sheets.

15. The cylindrical battery module of claim 14, further comprising a metal reinforcing sheet and a compressed foam disposed at both sides of each of the insulation sheets, wherein the compressed foam is disposed between a corresponding one of the brackets and a corresponding one of the insulation sheets.

16. The cylindrical battery module of claim 2, wherein surfaces of the cooling plate are provided with insulating paint layers.

17. The cylindrical battery module of claim 2, wherein the plurality of arc grooves are alternately defined on both sides of the cooling plate, and the plurality of arc grooves on the both sides of the cooling plate are matched, respectively, with the plurality of cylindrical cells of the cell assemblies in two adjacent rows.

18. The cylindrical battery module of claim 1, wherein every two adjacent rows of the cell assemblies are provided with the cooling plate therebetween, and the number of the cooling plates is less than the number of rows of the cell assemblies; and wherein the cooling plate comprises a first pipe and a second pipe, both the first pipe and the second pipe are annular, the first pipe and the second pipe are arranged side by side in a length direction of the cylindrical cells, and the first pipe and the second pipe are configured such that a coolant in the first pipe and a coolant in the second pipe circulate in opposite directions.

19. The cylindrical battery module of claim 18, wherein the cooling plate is equipped with a tube coupling assembly and a water chamber;

wherein the tube coupling assembly comprises a first water outlet coupling, a first water inlet coupling, a second water outlet coupling, and a second water inlet coupling, an outlet end and an inlet end of the first pipe are connected to the first water outlet coupling and the first water inlet coupling, respectively, and an outlet end and an inlet end of the second pipe are connected to the second water outlet coupling and the second water inlet coupling, respectively; and wherein the water chamber is divided into a first partial chamber, a second partial chamber, a third partial chamber, and a fourth partial chamber, the first partial chamber is communicated with the first water outlet coupling and a water outlet port of the first pipe, the second partial chamber is communicated with the first water inlet coupling and a water inlet port of the first pipe, the third partial chamber is communicated with the second water inlet coupling and a water inlet port of the second pipe, and the fourth partial chamber is communicated with the second water outlet coupling and a water outlet port of the second pipe.

20. The cylindrical battery module of claim 1, further comprising a plurality of keels arranged at intervals in the first direction, wherein one of the keels is disposed between two adjacent cylindrical cells of the cylindrical cells in at least one row of the cell assemblies, and the one of the keels is connected to the two adjacent cylindrical cells through a first structural adhesive layer;

wherein each of the keels is provided with a plurality of lightening holes, and an extension direction of each of the lightening holes is perpendicular to an extension direction of each of the cylindrical cells; and/or in a length direction of each of the keels, both ends of each of the keels are each provided with at least one buckle, each of the brackets is provided with at least one slot matching the at least one buckle, and the at least one buckle is engaged within the at least one slot.

* * * * *